US011905492B2

(12) United States Patent
Alwattari et al.

(10) Patent No.: US 11,905,492 B2
(45) Date of Patent: Feb. 20, 2024

(54) ODOR REMOVING COMPOSITION COMPRISING ZINC RICINOLEATE AND FLUOROSURFACTANT AND METHODS OF MAKING THEREOF

(71) Applicant: Illinois Tool Works Inc., Glenview, IL (US)

(72) Inventors: Ali Alwattari, Glenview, IL (US); Tsao-Chin Clarence Huang, Glenview, IL (US); John Nemec, Glenview, IL (US); Katherine Schwarze, Glenview, IL (US); John Escoto, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 326 days.

(21) Appl. No.: 17/179,968

(22) Filed: Feb. 19, 2021

(65) Prior Publication Data

US 2021/0261882 A1 Aug. 26, 2021

Related U.S. Application Data

(60) Provisional application No. 62/979,554, filed on Feb. 21, 2020.

(51) Int. Cl.

| | |
|---|---|
| ***C11D 1/94*** | (2006.01) |
| ***C11D 3/00*** | (2006.01) |
| ***C11D 3/37*** | (2006.01) |
| ***C11D 3/20*** | (2006.01) |
| ***C11D 1/83*** | (2006.01) |
| ***C11D 11/00*** | (2006.01) |
| ***C11D 17/00*** | (2006.01) |
| ***C11D 17/04*** | (2006.01) |
| ***C11D 3/50*** | (2006.01) |

(52) U.S. Cl.

CPC .............. *C11D 3/0068* (2013.01); *C11D 1/83* (2013.01); *C11D 3/0026* (2013.01); *C11D 3/2079* (2013.01); *C11D 3/2086* (2013.01); *C11D 3/373* (2013.01); *C11D 3/3715* (2013.01); *C11D 3/50* (2013.01); *C11D 11/0023* (2013.01); *C11D 17/0021* (2013.01); *C11D 17/0043* (2013.01); *C11D 17/049* (2013.01)

(58) Field of Classification Search

CPC ........... C11D 1/004; C11D 1/002; C11D 1/94; C11D 3/0068; C11D 3/3715; C11D 1/83; C11D 3/0026; C11D 3/50; C11D 7/50; C11D 11/0017; C11D 17/0021

See application file for complete search history.

(56) References Cited

U.S. PATENT DOCUMENTS

| | | | | |
|---|---|---|---|---|
| 7,226,584 | B2 | 6/2007 | Lersch et al. | |
| 2002/0197290 | A1* | 12/2002 | Di Pierro | A61K 8/63 424/401 |
| 2003/0165577 | A1* | 9/2003 | Bhagwat | A61Q 9/00 514/588 |
| 2003/0199402 | A1* | 10/2003 | Triplett | A61L 9/145 510/101 |
| 2007/0105745 | A1* | 5/2007 | Lawshe | C11D 3/2093 510/516 |
| 2008/0226886 | A1 | 9/2008 | Klausnitzer et al. | |
| 2010/0300694 | A1* | 12/2010 | Vonderhagen | A61Q 5/00 252/8.81 |
| 2014/0255077 | A1* | 9/2014 | Mobarak | A45D 40/00 401/88 |
| 2015/0118173 | A1* | 4/2015 | Farwick | A61Q 19/00 424/68 |
| 2015/0315527 | A1* | 11/2015 | Malaba | C08G 18/4238 524/251 |
| 2016/0213600 | A1* | 7/2016 | Klostermann | A61K 8/895 |
| 2017/0202770 | A1* | 7/2017 | Friedrich | A61Q 17/04 |

* cited by examiner

*Primary Examiner* — Charles I Boyer
(74) *Attorney, Agent, or Firm* — MaxGoLaw PLLC

(57) ABSTRACT

A composition is provided for hard surface cleaning and odor removal. Performance characteristics such as high odor removal and hard surface cleaning performance are achieved using a zinc ricinoleate-based odor neutralizer coupled with a polymeric ester based hard surface cleaning agent. The composition may be formulated for use in a trigger bottle, aerosol, or wipe applications.

18 Claims, No Drawings

ODOR REMOVING COMPOSITION COMPRISING ZINC RICINOLEATE AND FLUOROSURFACTANT AND METHODS OF MAKING THEREOF

RELATED APPLICATIONS

This application is a non-provisional application that claims priority benefit of U.S. Provisional Application Ser. No. 62/979,554 filed 21 Feb. 2020; the contents of which are hereby incorporated by reference.

FIELD OF THE INVENTION

The present invention in general relates to odor removing and hard surface cleaner compositions and the use thereof, and in particular, to a zinc ricinoleate-based odor neutralizer coupled with a polymeric ester containing hard surface cleaning agent in a composition.

BACKGROUND OF THE INVENTION

Hard surface cleaners are a category of cleaning agents of mainly aqueous solutions of specialty chemicals that vary with the amount of dirt and the surface being cleaned. All-purpose cleaners are typically concentrated solutions of surfactants and water softeners, which enhance the behavior of surfactant in hard water. Surfactants are compounds that lower the surface tension (or interfacial tension) between two liquids, between a gas and a liquid, or between a liquid and a solid. Surfactants may act as detergents, wetting agents, emulsifiers, foaming agents, and dispersants. In solution, detergents help solubilize a variety of chemical species by dissociating aggregates and unfolding proteins. Typical surfactants are alkylbenzenesulfonates, an anionic detergent, and modified fatty alcohols. A typical water softener is sodium triphosphate.

Odor removers as their name suggests remove odors from areas that are treated with the odor removers. Odor removers are often coupled with hard surface cleaning products to provide a total cleaning product. Typically, compositions for odor remover and hard surface cleaning products are blends of odor remover components and a hard surface cleaning agent that delivers high odor removal with hard surface cleaning performance characteristics.

While there are currently available hard surface cleaners with odor neutralizing properties there continues to be a need for compositions that provide improved surface cleaning and odor removal.

SUMMARY OF THE INVENTION

A composition is provided for hard surface cleaning and odor removal. The composition includes a polymeric ester based hard surface cleaning agent and a zinc ricinoleate-based odor neutralizer. The composition further includes one or more of a defoamer, a fragrance, and a wetting agent.

A water-based cleaning and odor removal composition is provided. The composition includes a polymeric ester based hard surface cleaning agent, a zinc ricinoleate-based odor neutralizer, water, and a wetting agent. The composition further includes one or more of a surfactant, a defoamer, a fragrance, and a wetting agent.

DETAILED DESCRIPTION OF THE PREFERRED EMBODIMENTS

The present invention has utility as a composition for hard surface cleaning with odor removal properties; in contrast to mere masking of odors. As a result, inventive compositions are well-suited for use in vehicle interior cleaning. In certain embodiments of the inventive composition, performance characteristics such as high odor removal and hard surface cleaning performance were surprisingly achieved by using a zinc ricinoleate-based odor neutralizer coupled with a polymeric ester based hard surface cleaning agent that have storage stability. Embodiments of the inventive composition may be formulated for use in a trigger bottle, aerosol, or wipe applications.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-4, 3-4, and 1-4.

Not intending to be limited to a particular theory, zinc ricinoleate-based odor neutralizers are not chemical odor masking agents such as mere fragrances but rather odor neutralizers that trap and absorb odors. Zinc ricinoleate-based odor neutralizers provide selective fixation of odor-active agents. Zinc ricinoleate is a water insoluble salt of ricinoleic acid, a major fatty acid found in castor oil. Zinc ricinoleate is used in many solid deodorants as an odor-adsorbing agent. The insoluble nature of this salt has generally precluded usage in spray formulas. Embodiments of the inventive zinc ricinoleate-based odor neutralizers maintain excellent clarity with excellent cold temperature stability and may be used as an additive in hard and soft surface cleaning formulations.

According to the present invention, zinc ricinoleate is dispersed with resort to a microemulsion. The zinc ricinoleate has a particle size of between 0.1 and 500 microns to facilitate dispersion. Typical loadings of zinc ricinoleate in a dispersion range from 1 to 30 total weight percent of the dispersion.

Anionic surfactants suitable for dispersing zinc ricinoleate particulate include sulfonates, sulfates, and carboxylates. Sulfonate anionic surfactants operative herein include $C_9$-$C_{15}$ alkylbenzenesulfonates; mixtures of alkene- and hydroxyalkane-sulfonates; and disulfonates such as those obtained by sulfonating mono-olefins and subsequent hydrolysis of the sulfonate group; alkanesulfonates; esters of α-sulfofatty acids, for example the α-sulfonic acids of hydrogenated methyl or ethyl esters of coconut oil, palm kernel oil or tallow fatty acid; and combinations thereof.

Suitable surfactants of the sulfate type include the sulfuric acid monoesters of primary alcohols, for example of coconut oil fatty alcohols, tallow fatty alcohols or oleyl alcohol, and those of secondary alcohols. Other suitable surfactants of the sulfate type include sulfatized fatty acid alkanolamides, fatty acid monoglycerides or reaction products of 1 to 4 mol of ethylene oxide with primary or secondary fatty alcohols or alkylphenols. Sulfated ethoxylates operative herein illustratively as anionic surfactants include sulfated nonyl phenol ethoxylates, alcohol ethoxysulfate salts, sodium N-methyl-N-oleoyltaurate, and sodium N-methyl-N-tall oil acid taurate Other suitable anionic surfactants include the fatty acid esters or amides of hydroxycarboxylic or aminocarboxylic or sulfonic acid, such as for example fatty acid sarcosides, glycolates, lactates, taurides or isethionates, α-sulfosuccinic acid esters and fatty acid cyanamides.

The hydrophobic radicals of the surfactants generally contain between 6 and 18 and preferably between 8 to 18 carbon atoms.

The anionic surfactants may be present in the form of their alkali metal, alkaline-earth and ammonium salts and as soluble salts of organic bases, for example of mono-, di- or triethanolamine.

In specific inventive embodiments, the zinc ricinoleate-based odor neutralizers are present in a microemulsion. In order to address the poor solvent solubility of zinc ricinoleate in water and other solvents acceptable for consumer settings, zinc ricinoleate is dispersed as particulate in with the aid of water and an anionic surfactant to form microemulsions (oil in water). The droplet size of the dispersed phase in the microemulsion is less than 100 nm and has an average size of between 10 and 100 nm and is thermodynamically stable.

In a water-based approach, a variety of anionic, cationic and non-ionic surfactants or stabilizing agents were used to emulsify the zinc ricinoleate-based odor neutralizer and the polymeric ester based hard surface cleaning agent in water to form the oil-in-water emulsion or microemulsion, or to form the water-in-oil emulsion. A wetting agent, such as an amphoteric polyfluoroalkyl betaine surfactant is present in the composition to promote wetting and reduce surface tension. In some inventive embodiments, a defoamer compatible with the remainder of the composition is provided and selected to retain the clear or translucent, or opaque liquid inventive composition as viewed with an unaided, normal human eye. A fragrance or other ancillary additives is present in some inventive compositions.

A polymeric ester based hard surface cleaning agent is in the form of a substantially dilute oil-in-water microemulsion having an aqueous continuous phase and a minority oil phase. The dilute microemulsion composition includes, an anionic surfactant, water-mixable cosurfactant, and an esterified ethoxylated polyhydric alcohol, the remainder being water. A typical polymeric ester based hard surface cleaning agent is composed of 0.1% to 20% of an anionic surfactant, 0 to 10% of a supplemental grease agent, 0 to 50% of a water mixable cosurfactant, and 0.1% to 10% of the ethoxylated polyhydric alcohol, in a water base.

Embodiments of the inventive odor remover and hard surface cleaning product formulations may include a defoamer that delivers optimum defoaming performance without a reduction of the transparency of the clear formula as viewed with an unaided, normal human eye. Defoamers may be added to the formula to minimize the foam in the formula. In specific inventive embodiments of the inventive odor remover and hard surface cleaning product formulations, a selected fragrance or other ancillary additives which have good compatibility with the rest of the formula may be added to the formula to provide a desired scent.

A hydrocarbon solvent compatible with both the zinc ricinoleate-based odor neutralizer and the polymeric ester based hard surface cleaning agent acts as a volatile carrier in some embodiments of the present formula. A wetting agent, such as a perfluoroalkyl- or polyfluoroalkyl-containing compound is present in the composition to promote wetting and reduce surface tension. In some inventive embodiments, a defoamer compatible with the remainder of the composition is provided and selected to retain transparency of the clear and colorless liquid inventive composition as viewed with an unaided, normal human eye. A fragrance or other ancillary additives is present in some inventive compositions.

Wetting agents operative herein illustratively is a nonionic polymeric fluorochemical surfactant, a fluoroaliphatic polymeric ester in a hydrocarbon solution, a polyfluoroalkyl betaine amphoteric surfactant, nonionic polymeric fluorinated surfactants, anionic phosphonated fluorinated surfactants, nonionic ethoxylated fluorinated surfactants, or a combination thereof. Typically, the wetting agent is present from 0.05 to 4 total percent, while in some other embodiments is present from 0.1 to 0.7 total weight percent.

In the water-based approach, wetting agents operative herein illustratively is an amphoteric polyfluoroalkyl betain surfactant, nonionic polymeric fluorinated surfactants, anionic phosphonated fluorinated surfactants, nonionic ethoxylated fluorinated surfactants, or a combination thereof. Typically, the wetting agent is present from 0.05 to 4 total percent, while in some other embodiments is present from 0.1 to 0.7 total weight percent.

Defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes. While the optimal amount of a given defoamer depends on a variety of factors that include viscosities and surface tension of other components, a defoamer, if present, is included in amounts of up to 5 total weight percent and in other embodiments from 0.05 to 1 total percent.

Inventive water-based hard surface cleaning and odor removing compositions include in some embodiments a surfactant present in an amount to emulsify the zinc ricinoleate-based odor neutralizer and the polymeric ester based hard surface cleaning agent of the inventive composition to an extent such that the composition is able to form a stable oil-in-water emulsion, or microemulsion. Surfactants operative herein illustratively include nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate, polymeric fluorinated, ethoxylated alcohol, ethoxylated fatty acid, sorbitan ester, ethoxylated castor oils, alkyl polysaccharides, sorbitan monostearate, sorbitan monolaurate, sorbitan oleate, polyoxyethylene sorbitan, polyoxyethylene sorbitan fatty acid ester, polyoxyethylene sorbitan monooleate surfactants; or anionic phosphonated fluorinated, phosphate ester, aliphatic phosphate ester; or cationic ethoxylated fatty ammonium ethosulphate, ethoxylated alkyl amine surfactants. A surfactant, if present, is included in amounts of up to 5 total weight percent and in other embodiments from 0.05 to 1 total percent.

An inventive odor remover and hard surface cleaning composition in some embodiments includes a fragrance. A fragrance, if present is included in amounts of up to 5 total weight percent and in other embodiments from 0.1 to 3 total percent.

An inventive odor remover and hard surface cleaning composition in some embodiments includes a dye such as azo dyes, anthraquinone dyes, anthocyanins dyes, polyphenolic dyes, or combinations thereof. A dye, if present, is included in amounts of up to 1 total weight percent and in other embodiments from 0.1 to 0.5 total percent.

The components of an inventive odor remover and hard surface cleaning composition are solvated to dissolve in a solvent to yield a clear, colorless solution with the proviso that pigment is dispersed and absent a dye intended to impart a color. The solvent of the present invention is petroleum distillates with the Kauri-Butanol values range from 20 to 40 as measured by ASTM D1133 Test Method. As used herein, petroleum distillates include hydrocarbon solvents, aliphatic solvents, white oils, hydrotreated solvents, straight distillate solvents, mineral spirits, kerosene, white spirits, naphtha, and Stoddard solvents. The solvent constituting the remainder of the formulation. Typical amounts of solvent are from 10 to 80 total weight percent.

In some embodiments, hydrotreated light paraffinic distillates are present as a co-solvent. As used herein, hydrotreated light paraffinic distillates are defined as complex combination of hydrocarbons obtained by treating a petroleum fraction with hydrogen in the presence of a catalyst that contains hydrocarbons having carbon numbers predominantly in the range of $C_{15}$-$C_{30}$ with a viscosity of less than 19 centiStokes (cSt) at 40° C. with saturated hydrocarbons being a major constituent thereof. Hydrotreated light paraffinic distillates, if present, are included in amounts of up to 10 total weight percent and in other embodiments from 3 to 8 total percent.

An inventive odor remover and hard surface cleaning composition is readily applied through resort to a conventional trigger spray application, propellant aerosol, or a sponge or cloth for wipe application onto the surface to be cleaned.

An inventive odor remover and hard surface cleaning composition has a fully formulated viscosity of between 5 and 400 cSt, as measured at room temperature.

Typical and preferred compositions according to the present invention are provided in Table 1.

TABLE 1

Inventive Odor Remover and Hard Surface Cleaning Composition (amounts in total weight)

| Ingredient | Typical | Preferred, if present |
|---|---|---|
| Polymeric ester based hard surface cleaning agent (oil in water emulsion or microemulsion) | 10-60 | 23-60 |
| Zinc ricinoleate-based odor neutralizer in form of a dispersion or solution with surfactant and water (20 wt. % zinc ricinoleate) | 0.5-10 | 1-5 |
| Wetting Agent | 0.05-4 | 0.1-0.7 |
| Defoamer | 0-5 | 0.05-1 |
| Fragrance | 0-1 | 0.01-0.5 |
| Surfactant (dispersion) | 0-5 | 0.1-3 |
| Pigment | 0-3 | 0.1-1 |
| Dye | 0-1 | 0-0.5 |
| Co-solvent | 0-10 | 3-8 |
| Water | to 100% | to 100% |

The present invention is further detailed with respect to the following nonlimiting examples that are provided to further illustrate the preparation of inventive compositions and certain attributes associated with the resulting coatings on tire surfaces.

EXAMPLES

Example 1

The following compositions were determined to provide compositions that form an odor remover and hard surface cleaning product. The fully solvated compositions are clear solutions and are provided with an artificial odor from the fragrance.

Inventive composition 1

| Ingredient | Weight Percent (%) |
|---|---|
| Polymeric Ester Based Hard Surface Cleaning Agent | 0.1-2.0 |
| Zinc Ricinoleate-based Odor Neutralizer microemulsion (20 wt. % zinc ricinoleate) | 0.5-10 |
| Wetting Agent | 0.20 |
| Polysiloxane Defoamer | 0.10 |
| Fragrance | 0.10 |
| Water | to 100% |

Example 2

The following formulas were tried in weight percent (%).

Formulation: 00018-133-01

| Ingredient | Weight Percent (%) |
|---|---|
| Water | 94.67 |
| Zinc Ricinoleate-based Odor Neutralizer microemulsion (20 wt. % zinc ricinoleate) | 5.00 |
| Polymer Ester (CAS Number 74350-59-7) | 0.30 |
| 19% active aqueous solution of 1,2 Benzisothiazolin-3-one (BIT) in dipropylene glycol and water | 0.03 |

Formulation: 00018-133-02

| Ingredient | Weight Percent (%) |
|---|---|
| Water | 94.67 |
| Zinc Ricinoleate-based Odor Neutralizer (20 wt. % in solution) | 5.00 |
| Polymer Ester (CAS Number 74350-59-7) | 0.30 |
| 19% BIT in dipropylene glycol and water | 0.03 |

Formulation: 00018-133-02 A & B

| Ingredient | Weight Percent (%) |
|---|---|
| Water | 94.57 |
| Zinc Ricinoleate-based Odor Neutralizer (20 wt. % in solution) | 5.00 |
| Polymer Ester (CAS Number 74350-59-7) | 0.30 |
| 19% BIT in dipropylene glycol and water | 0.03 |
| Fragrance A | 0.10 A or |
| Fragrance B | 0.10 B |

The formulations 00018-133-02 A and 00018-133-02 B proved to be highly effective in removing odor from different scents/odor testing cloth.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A composition for hard surface cleaning and odor removal, said composition comprising:

a polymeric ester based hard surface cleaning agent;

a dispersion of zinc ricinoleate in an oil in water microemulsion;

a defoamer;

a fragrance present from 0.05 to 1 total weight percent;

a wetting agent of a non-ionic polymeric fluorochemical surfactant, a fluoroaliphatic polymeric ester in a hydrocarbon solution, a polyfluoroalkyl betaine amphoteric surfactant, or a combination thereof; and water containing said polymeric ester based hard surface cleaning agent, said dispersion, said defoamer, said wetting agent, and said fragrance.

2. The composition of claim 1 wherein said defoamer is a polysiloxane.

3. The composition of claim 1 wherein said defoamer is present from 0.05 to 1 total weight percent of the composition.

4. A composition for hard surface cleaning and odor removal, said composition comprising:

a polymeric ester based hard surface cleaning agent;

a dispersion of zinc ricinoleate in an oil in water emulsion; and a wetting agent that is a non-ionic polymeric fluorochemical surfactant, a fluoroaliphatic polymeric ester in a hydrocarbon solution, a polyfluoroalkyl betaine amphoteric surfactant, or a combination thereof.

5. The composition of claim 1 further comprising an additional surfactant.

6. A composition for hard surface cleaning and odor removal, said composition comprising:

A) a polymeric ester-based hard surface cleaning agent comprising:

i) 0.1% to 20% of a cleaning agent anionic surfactant;

ii) 0 to 10% of a supplemental grease agent;

iii) 0 to 50% of a water miscible cosurfactant; and v) 0.1% to 10% of an ethoxylated polyhydric alcohol in a water base;

B) a wetting agent that is a non-ionic polymeric fluorochemical surfactant, a fluoroaliphatic polymeric ester in a hydrocarbon solution, a polyfluoroalkyl betaine amphoteric surfactant, or a combination thereof; and C) a dispersion of zinc ricinoleate in an oil in water emulsion.

7. The composition of claim 1 wherein said polymeric ester based hard surface cleaning agent is an emulsion or a microemulsion.

8. A method of removing odor from a vehicle interior comprising:

applying the composition of claim 1 to a surface of the vehicle interior; and allowing sufficient time for the odor to be deactivated by said dispersion.

9. The method of claim 8 further comprising wiping excess of the composition from the surface to effect cleaning of the surface.

10. The method of claim 8 wherein the applying is by a technique from among trigger spray application, propellant aerosol application, sponge application, or cloth application.

11. The composition of claim 5 wherein the surfactant is anionic.

12. The composition of claim 4 further comprising a defoamer.

13. The composition of claim 12 wherein said defoamer is a polysiloxane.

14. The composition of claim 12 wherein said defoamer is present from 0.05 to 1 total weight percent of the composition.

15. The composition of claim 4 further comprising a fragrance.

16. The composition of claim 15 wherein said fragrance is present from 0.05 to 1 total weight percent of the composition.

17. The composition of claim 6 further comprising a defoamer.

18. The composition of claim 6 further comprising a fragrance.

* * * * *